Feb. 26, 1952 H. F. WILDER 2,587,561
TELEGRAPH SIGNAL BIAS METER
Filed Oct. 12, 1950
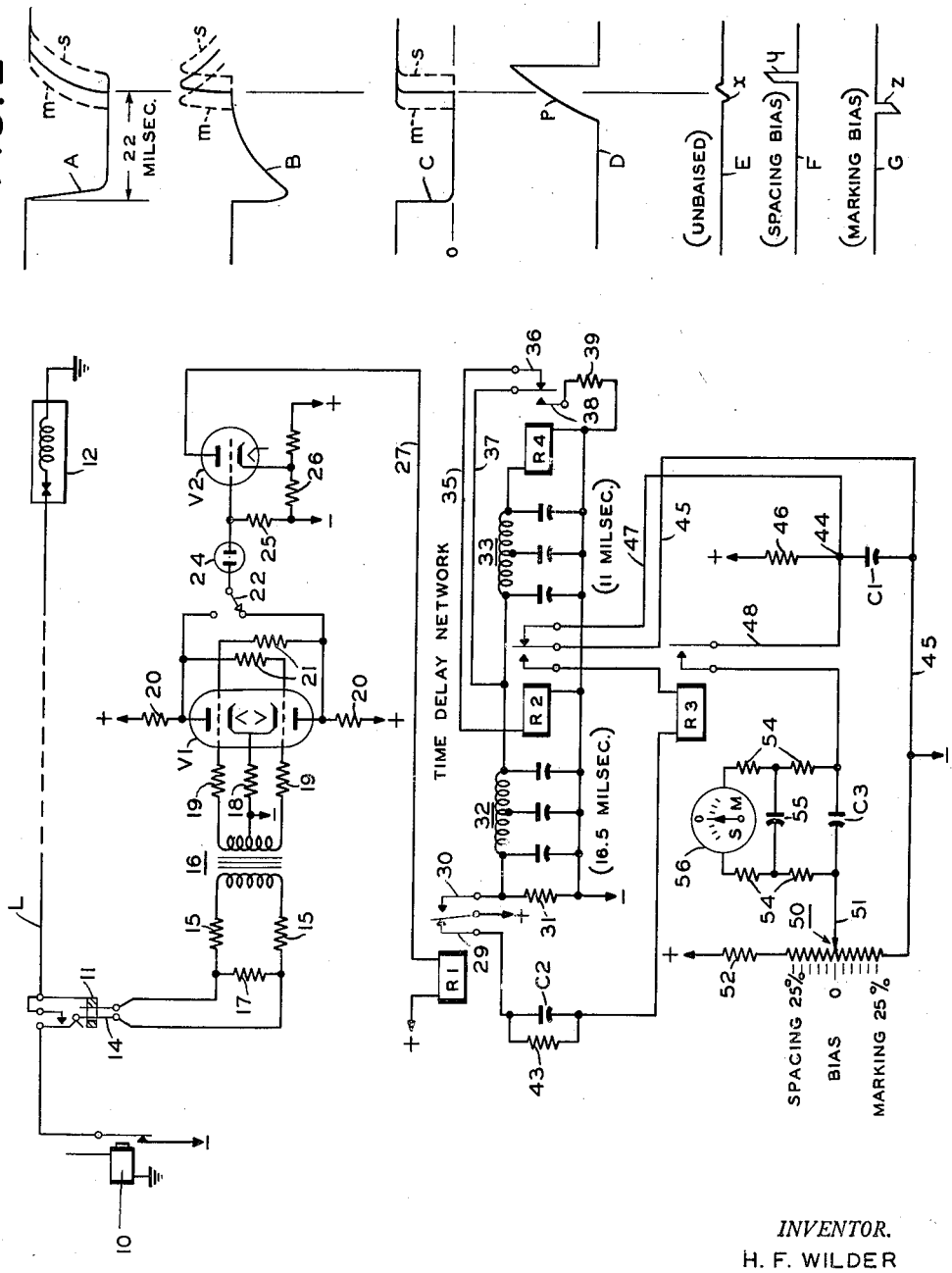
INVENTOR.
H. F. WILDER
BY
ATTORNEY Patented Feb. 26, 1952

2,587,561

UNITED STATES PATENT OFFICE 2,587,561

TELEGRAPH SIGNAL BIAS METER

Harold F. Wilder, Wyckoff, N. J., assignor to The Western Union Telegraph Company, New York, N. Y., a corporation of New York Application October 12, 1950, Serial No. 189,707

14 Claims. (Cl. 178—69)

This invention relates to a telegraph signal bias meter and more particularly to a bias meter for determining the percentage of any marking or spacing bias present in permutation code telegraph signals.

At the station of origin, permutation code telegraph signals are set up by the contacts of the operator's keyboard or or by an automatic transmitter, and upon reception of the distant terminal reappear in the magnet of a receiving instrument such as a teleprinter. In a complex modern telegraph system, however, these simple states exist only at the sending and receiving points, and in transmission over the various media now available the fundamental form of signal impulses will very likely be translated into one or more other forms of electric energy as the useful frequency spectrum of the interconnecting facility is subdivided to obtain a desired number of individual channels of communication. In such frequency subdivision systems the original signal disappears in the modulation of a carrier frequency that in turn is channelized by frequency selective networks, or the facility may be subdivided on a time division or multiplex basis or a combination of both processes. On the other hand, the frequency spectrum of the line between the stations may be so narrow that only a single teleprinter channel can be accommodated, and if this line is long electrically the make-break signals may be converted to the two-current or polar form at the relaying stations for best operation. Irrespective of the manner of transmission, the unit time intervals are, after frequency selection and demodulation or time selection, distributed to the receiving teleprinter or other receiving device in the form of single current or make-break impulses. These unit intervals have two dimensions, namely, the magnitude of the operating current and its time of duration, and while the teleprinter or other receiving instrument exhibits considerable tolerance to variations in these dimensions, either the wide-band telegraph system or the relatively simple D. C. telegraph line presents opportunity for changes to occur either in the modulation and demodulation processes in the more complex systems or simply because of lack of symmetry of response of relaying devices in the case of the narrow-band line.

Since all receivers in a given circuit have substantially the same impedance, the magnitude of the operating force can be regulated by adjusting the current in the teleprinter lines to a uniform level, and such current regulation may readily be effected in a known manner by means of a line milliammeter and a rheostat. By means of a suitable bias meter such as disclosed herein the second dimension of the signal unit interval, its time of duration, can also simply and easily be measured, and without the necessity of transmitting special test signals or the interruption of the normal flow of traffic over the line. The operating technician can also reduce any consistent distortion in time of the unit intervals, familiarly known as signal bias, to zero or tolerable limits.

In teleprinter or semi-synchronous signaling, the intelligence of a single character is contained within the various combinations of the 5-unit Baudot code with each group preceded by a start impulse or open line interval to initiate operation of the receiving device and followed by a closed line interval to bring all apparatus to a stop in anticipation of the next character. Each character, therefore, consists of a total of seven unit intervals and there are two variations of this code of sufficient importance to make desirable a signal bias meter capable of use with either code. In the uniform 7-unit code all unit intervals are of the same time of duration when transmission is continuous at a predetermined maximum rate, such as for example, the rate of 396 characters per minute commonly employed in commercial start-stop telegraph systems. For the non-uniform code such as a 7.42-unit code, the stop interval is made 42% longer than the preceding six impulses and the maximum rate of transmission is reduced accordingly, for example, to 368 characters per minute. Irrespective of whether a uniform or non-uniform code is employed, however, a single spacing or open line interval will have a normal time of duration, which in common commercial practice is 22 milliseconds, and advantage is taken of this fact to cause the bias meter to measure the time length of spacing impulses alone. Any departure from the normal is indicated as marking or spacing bias depending on whether the unit spacing intervals are consistently shorter or longer, respectively, than the normal time of duration such as 22 milliseconds.

An object of the instant invention is to provide a signal bias meter in which the apparatus and circuit arrangements are relatively simple, and which does not require the services of highly skilled technicians to properly operate and interpret the same.

Another object is the provision of a bias meter which will indicate and measure signal bias during the transmission of either sporadic or continuous traffic signals on working circuits without interruption of the traffic flow.

An additional object is a bias meter in which, notwithstanding the simplicity of the circuit and apparatus employed, the accuracy of observation is sufficient for proper circuit maintenance.

A further object is to provide a lightweight, portable direct-reading bias meter which can be carried into the field and readily may be plugged into working circuits at various repeater or terminal points in order to check the transmission bias characteristics and effect the necessary adjustments or corrections.

Still another object is a bias meter which may be used either with a uniform start-stop code in which all unit intervals of each character are of the same time duration or with a non-uniform start-stop code in which the stop interval of each character is longer than any of the preceding unit intervals thereof.

An additional object is to provide, in a system of the character disclosed, suitable means for separating telegraph line potentials from the source of power employed to energize a device responsive to incoming permutation code signals, and in which low frequency components of the signal impulses are removed thereby to cause the operating time of the device to be unaffected by such components of an immediately preceding signal impulse.

Other objects and advantages will be apparent from the following description of an illustrative embodiment of the invention, taken in connection with the accompanying drawings, in which:

Fig. 1 shows the circuit arrangement of a signal bias meter in accordance with the instant invention, which is plugged into a start-stop telegraph line for determining the percentage of marking or spacing bias present in the signals transmitted over the line; and Fig. 2 discloses a plurality of wave forms useful in explaining the advantages and method of operation of the signal bias meter.

A circuit frequently employed for the measurement of time intervals is a series combination of a resistor and a capacitor where the elapsed time after the application of a battery can be determined by the measurement of the potential developed across the capacitor, and this principle is employed in the instant signal bias meter in combination with circuit arrangements for increasing the precision of measurement. If the charging of the timing capacitor is not begun until the signal unit interval has persisted for a considerable portion of its time of duration, the rate of build up of voltage across the capacitor is much more rapid than if charging had been initiated at the beginning of the signal impulse. For example, in the case of signals in which the normal time of duration of a spacing signal unit interval is 22 milliseconds, if the charging of the timing capacitor does not begin until the signal unit interval has persisted for approximately three-quarters (16.5 milliseconds) of its normal time of duration, the rate of build up of voltage across the capacitor during the remainder of the signal unit interval plus a 25% margin for spacing bias is nearly three times more rapid than if charging had been initiated at the beginning of the signal unit interval, and this results in an accuracy of observation within about 2% which is sufficient for proper circuit maintenance.

Circuit description

Referring now to Fig. 1 of the drawings, there is shown a line L which extends to a teleprinter or other telegraph receiving apparatus 12, a source of incoming signals being indicated by a relay 10 which causes single current or make-break impulses to be transmitted to the teleprinter 12. The armature of the repeating relay 10 is against the make contact when the relay is energized, thereby to apply negative battery to the line to represent either a marking impulse or an idle condition of the line which is closed and marking in character when no signals are being transmitted. The repeating relay 10 may be operated either by polar signals or by single current signals. When the relay is deenergized, its armature is operated to produce a spacing, or open line, unit interval. Connected in the line L is a jack 11 into which may be inserted a plug 14 thereby to connect the bias meter in series circuit relation with the line. When plug 14 is withdrawn, the line L is automatically re-closed by reason of the contact springs in the jack.

The plug 14 is connected by two conductors through resistances 15 to the primary winding of a transformer 16, a resistor 17 being connected in series with the line and bridged across the primary winding. The secondary of transformer 16 has the ends of its winding connected through resistances 19 to the control grids of a dual triode trigger tube VI which may be either a vacuum tube or a gas filled tube such as a Thyratron. The midpoint of the secondary winding is connected to a source of negative potential which latter is connected through a biasing resistor 18 to the cathodes of the tube sections of the tube VI which for purposes of illustration is shown as a vacuum tube. Separate tubes may be employed instead of a two-section tube as shown. Each of the anodes of tube VI is connected through a resistance 20 to a source of positive battery and each anode is also connected through a resistance 21 to the control grid of the other section of the tube. The sections of the tube are thus provided with inverse biasing circuits whereby the responses of the respective sections are made substantially instantaneous and the sections are definitely banked at one or the other of two operating conditions until the polarity of the voltage applied to their input circuit is reversed.

The line current to the distant teleprinter flows through resistor 17 but as a practical matter it is necessary to decouple the voltage developed across resistor 17 from the source of power energizing the bias meter, and this decoupling is effected by the transformer 16. The two resistors 15 between resistor 17 and the primary of transformer 16 are inserted to produce, in combination with the resistor 17 and the transformer primary, a frequency discriminating circuit to reduce the overall transfer admittance for low frequency components of the signal and to cause the voltage induced in the secondary winding to decline to zero in approximately unit interval signal time. This precludes the presence in the secondary winding circuit of any transient voltage which would cause a variation in the instant of triggering of the trigger tube circuit as various combinations of signal impulses are received, and this obviates the possibility of the error which otherwise would be introduced into the bias meter by reason of improper triggering of the tube. The values of the resistors necessary to thus reduce the overall transfer admittance in the circuit illustrated are determined primarily by the inductance of the primary winding of the transformer. For example, if the primary winding has an inductance of approximately 10 henries and the resistor 17 has a low value, such as 100 ohms, each of the resistors 15 may have a value of approximately 500 ohms. The proper values in any case may be determined either empirically or by known engineering formulae. For practical purposes two resistors 15 are employed, although they may be embodied in a single resistor in one side of the frequency discriminator circuit or it could be embodied in the primary winding of the transformer. The frequency discriminating circuit makes the operation of the trigger tube independent of the wave form of the signal current in the telegraph line, and this makes the operation of the tube dependent upon the fundamental time of duration of each marking and spacing impulse received over the line.

Each anode of tube V1 is also connected to a contact of a manually operable switch 22, the circuit through the switch continuing through a glow discharge lamp 24 and a resistor 25 to negative battery. The lamp 24 and resistor 25 are connected to the control grid of a drive tube V2, and connected to the cathode of this tube is a potentiometer 26 to provide a suitable cut-off bias for the tube.

The anode circuit of tube V2 is connected in series, by means of conductor 27, with the operate winding of a relay R1. The relay R1 has an armature connected to positive battery, a make contact 29 which is a "marking" contact, and a break contact 30 which is a "spacing" contact. Contact 30 is connected through a resistor 31 to negative battery, and the resistor is bridged across the input of a time delay network comprising two portions 32 and 33 which successively introduce time delay intervals of 16.5 milliseconds and 11 milliseconds. Intermediate with these delay portions of the network is connected a relay R2, one end of the operate winding of the relay being connected directly to one side of the time delay network and the other end of the winding being connected through a circuit comprising conductor 35, armature and break contact 36 of a relay R4, and conductor 37 to the other side of the time delay network. The operate winding of the relay R4 is bridged across the time delay network at the end thereof. One end of its operate winding also is connected through a resistor 39 to a make contact 38 of the relay.

The armature and break contact of relay R2 and conductors 45 and 47 provide a shunt circuit across a capacitor C1, so that when the relay is deenergized these contacts effectively short-circuit the capacitor. A source of positive battery is connected through a current limiting resistor 46 to one terminal 44 of the condenser C1, and through conductor 48 is connected to the armature of a relay R3. The rate at which the potential will build up across a condenser C1 of given value will, of course, depend upon the value of resistance 46. One end of the operate winding of relay R3 is connected to the make contact of relay R2, and the other end of the winding of R3 is connected to a capacitor C2 which is shunted by a resistor 43, the other end of the capacitor being connected to the make (marking) contact 29 of relay R1. The make contact of relay R3 is connected in circuit with a capacitor C3 and thence to the slider 51 of a bias potentiometer 50. One end of the potentiometer is connected to a source of negative battery, and the other end of the potentiometer is connected through a current limiting resistor 52 to a source of positive battery. Connected in shunt with the capacitor C3 is a null indicating measuring instrument, such as a microammeter 56, which will deflect either to the left or to the right of a zero position depending upon whether spacing or marking bias is present in the signals under test. The deflections of the meter are damped by a resistive capacitative network 54, 55 which couples the meter to the capacitor C3, thereby to eliminate what would otherwise be an objectionable susceptibility to sporadic unit intervals of different than average time length. The potentiometer 50 has a calibrated dial or scale which may manually be slid or rotated in either direction relative to an instant setting of the slider 51 and which enables direct reading of the percentage of the marking or spacing bias present in the signals under test.

*Operation*

It is well known that in transmission the originally sharply defined contours of the signal impulses become rounded off and the transitions from marking to spacing conditions, and vice versa, may then be shifted in time by the relaying device if the latter has a different sensitivity to signal transitions in one direction as opposed to signal transitions of the opposite change in polarity. The effect of this is to cause the time of duration of all spacing impulses to be longer or shorter than the standard interval which, in the case of commercial teleprinter lines commonly employed in the telegraph art, is 22 milliseconds. If the spacing impulses are consistently longer in time of duration than the standard interval, the signals are said to be biased to spacing; if shorter, they are biased to marking. In order that the response of the bias meter shall be unaffected by the wave form or magnitude of the teleprinter line current and, therefore, independent of the amount of cable or the number of teleprinters on the line, the actual time measuring circuit components are operated by an electronic relay such as the flip-flop vacuum tube assembly V1 which has only two stable states; one tube section or the other can alone be conducting. The relay V1 is coupled by the transformer 16 to the resistor 17 inserted in the teleprinter line, and the choice of circuit constants including those of resistances 15 and transformer 16 is such as to produce in the secondary winding of the transformer voltage impulses whose amplitudes occur when the line current begins to either build up or to decay. These abrupt discontinuities mark off the second dimension, or time of duration, of the signal unit interval. Thus the bias meter examines only single isolated spacing impulses, and disregards all marking impulses, and so becomes useful for observation of signals in either of the teleprinter codes hereinbefore referred to.

The trigger tube reproduces the timing of the signals in the circuit under test, generating a signal voltage of rectangular wave form whose transitions occur at the instants the impulses in the circuit under test begin to change and not at some later time up on the sloping wave front of the line current. The self-bias resistor 18 develops a grid bias voltage sufficient to prevent the trigger tube V1 from reversing from one stable state to the other if small extraneous interfering currents are also present in the circuit under test. With a current of 70 ma. in a make-break teleprinter leg such as the line L, a voltage of 7 volts will be developed across the 100 ohm resistor 17 (the insertion of the 100 ohms will reduce the leg current to 66 ma.) Seven volts is of the order of two and a half times the minimum voltage necessary to insure faithful operation of the trigger tube, and so the exact value of the leg current has little bearing. By the same token, if the bias meter is inserted in a polar current circuit, such as the dummy circuit of a network repeater system, the polar current can be as low as plus or minus 25 ma.

The plate potential of either section of tube V1 swings from 105 volts positive in the non-conductive state to 30 volts positive if the tube is drawing plate current. When the line L in which the meter is inserted is at rest, one of the tube sections will be left in the non-conductive state and it is imperative that this particular section be connected to the grid of the relay drive tube V2 so that the latter will also be conductive and its plate current will hold relay R1 energized on its marking contact 29. It is for this reason that this current from the plate circuit of tube V1, which flows through resistor 25 to neutralize the 30 volt cut-off bias across the resistor 26, is passed through a glow discharge tube such as the neon tube 24. The observer or operating technician must always make certain that this lamp glows during a pause in transmission, and if it does not glow during a prolonged circuit rest period, then the switch 22 should be thrown, thus transferring control to the other section of the tube which will be non-conducting. This precaution will insure that the reading of the bias meter for a biased signal condition is of the correct sense; otherwise, for example, a spacing bias would be indicated by a marking deflection of the microammeter 56. Futhermore, it will prevent the bias meter from attempting to read the long rest pulse of 7.42 unit code signals, and if these should be shorter than normal because of a spacing bias, the meter indications would be confusing. The glow lamp 24 employed in the circuit illustrated preferably has a voltage drop of 60 volts.

The isolated spacing signal impulses in the line L produce steep fronted voltage transients in the transformer 16. These wave forms are illustrated at A and B in Fig. 2. Wave form A shows in full line the transient produced by a proper spacing signal having a period of 22 milliseconds; the broken line portion $m$ indicates the form when marking bias is present, and the broken line $s$ indicates the form when spacing bias is present. Wave form B shows in similar manner the secondary voltage generated in the transformer 16.

The grid of the relay drive tube V2 is subject to the swings in potential of the correct anode of the dual triode trigger tube V1, and in response to the corresponding changes in anode current of the relay drive tube and conductor 27, the relay R1 operates or releases coincident with the initial portions of the build up or decay of the teleprinter line current. Wave form C in Fig. 2 depicts the anode current that controls the relay. Upon the decay of the line current, at the beginning of a spacing signal unit interval, relay R1 is released and through its armature and break contact 30 impresses positive battery potential on the input of the first portion 32 of the previously deenergized time delay network. After a delay equal to a considerable portion, for example, three-quarters, of the normal length unit interval, the junction of the two portions 32 and 33 of the network becomes energized and relay R2 is operated. Operation of this relay removes the short circuit previously maintained through conductors 45 and 47 on the capacitor C1, and prepares a path to negative battery, through conductor 45 and armature and make contact of relay R2, for the operation of relay R3 which at this time, however, remains unoperated since relay R1 is still released. The capacitor C1 now begins to charge and the voltage on its upper terminal 44 rises exponentially with time in a positive direction. It is this voltage that is to be compared, at the instant the teleprinter line is reclosed, to a predetermined normal, or reference, voltage obtained from the bias potentiometer 50.

For a single unbiased spacing signal unit interval, the reenergization of relay R1 will occur exactly 22 milliseconds after its release and the restoration of the armature of this relay to its make contact 29 will then charge the capacitor C2 through the operate winding of relay R3 and the armature and make contact of energized relay R2. Because the charging current to capacitor C1 is of extremely short duration, the contacts of R3, which is a sampling relay, close only momentarily and at this instant the voltage across capacitor C1 is compared to the reference voltage at the potentiometer. In the presence of unbiased signals, the voltage across the capacitor will have an average value equal to the voltage obtained from the potentiometer when set for zero bias and there will be no energy transfer.

If the teleprinter signals are biased to spacing, the spacing signal unit interals will be longer than normal, and reenergization of relay R1 and the instant of comparison will take place when the voltage across C1 is greater than the voltage at the bias potentiometer. Under this condition current will flow from capacitor C1 towards the potentiometer and as a result of this current flow, a charge will be stored on capacitor C3. The charges stored on C3, one for each isolated spacing signal impulse, will be dissipated in the bias indicating microammeter 56 connected in shunt with C3, and the meter will be deflected to the left as viewed in Fig. 1 to indicate a spacing bias. The deflections of the meter are damped by the resistive or capacitive network 54, 55 coupling the meter to capacitor C3 to eliminate what would otherwise be an objectionable susceptibility to sporadic unit intervals of different than average time length, but because the number of isolated spacing signal units arriving from time to time will vary with the intelligence transmitted, the magnitude of the microammeter deflection will be variable and indeterminate. However, the operating technician may reduce the bias to zero by adjusting the bias control on the telegraph apparatus until the microammeter remains undisturbed at zero, or he may measure the magnitude of the signal bias by nulling the microammeter by adjusting the slider 51 so as to obtain from the bias potentiometer 50 a potential equal to that developed across capacitor C1 at the instant of comparison. The signal bias in percent is read directly from the scale markings in the dial.

If the signals having a marking bias, the instant of comparison occurs early and since the voltage across capacitor C1 is less than normal the flow of current will be away from the potentiometer 50. Consequently, the increments of charge stored on capacitor C3 will be of the opposite polarity and the microammeter will deflect to the right. In either case the system is responsive to a succeeding signal transition from spacing to marking for measuring at that instant the magnitude and polarity of the difference voltage between the reference voltage and the voltage then appearing across the capacitor and includes means for interpreting this difference voltage in terms of percentage of marking or spacing bias.

To prevent a false indication from a spacing signal two or more units long, the relay R4 is arranged to remove the operate coil of relay R2 from the network junction eleven milliseconds following its initial operation, that is, in the subsequent time interval of eleven milliseconds after operation of relay R2, the energy originally sent into the delay network passes through the second delay section 33 and energizes relay R4. Operation of the latter relay, at its armature and make contact 38, substitutes across the network junction an equivalent resistance 39 for the relay R2, permitting the latter to release and so discharge the capacitor C1 through conductors 45 and 47 and the armature and break contact of R2. The release of relay R2 opens the operating circuit for sampling relay R3 so that the latter is not energized when relay R1 again returns to its marking contact 29 in response to a space to mark transition. If desired, a current limiting resistor, for example, a resistance of 200 ohms, may be inserted in one of the conductors 45 and 47.

Every signal transition from marking to spacing causes a quasi saw-toothed voltage wave to appear across capacitor C1, such a voltage wave being shown at D in Fig. 2. Curve E of Fig. 2 depicts that no net charge is accumulated on capacitor C3 when unbiased signals are being received, and it will be noted from the portion $x$ of this curve that the time of comparison as determined by the relay R3 occurs at approximately the midpoint $p$ of the sloping portion of the curve D, so that comparisons are effected during an abrupt voltage rise across capacitor C1. Curve F of Fig. 2 shows at $y$ the increment of charging current to capacitor C3 when a signal impulse having spacing bias has been received; the time of comparison as determined by the relay R3 occurs between the midpoint $p$ and the peak of the exponential voltage rise across capacitor C1. Curve G of Fig. 2 depicts at $z$ the increment of charging current to capacitor C3 when a signal impulse having marking bias has been received, and it will be noted by reference to curve D that the time of comparison determined by the relay R3 occurs between the beginning and the midpoint $p$ of the exponential voltage rise across capacitor C1. In each of these cases, it will be seen that the comparison operation occurs during a very high rate of build up of voltage across the capacitor C1, thereby greatly increasing the accuracy of observation. Since the release of relay R2, due to the operation of relay R4, opens the operating circuit of the sampling relay R3, the ultimate reenergization of relay R1 does not effect on unwanted voltage comparison.

The magnitude of marking or spacing bias likely to be encountered in practice seldom exceeds 25%, corresponding to a time shift of the space to mark signal transition of 5.5 milliseconds on either side of the normal time of return, and if the range of the bias meter extends to plus or minus 25%, this ordinarily is sufficient, and is obtained with the network time delay values indicated in Fig. 1. If some unusual condition should be encountered, such as if the bias were marking and in excess of 25%, the operation of the sampling relay R3 would be initiated by the operation of relay R2 instead of by relay R1 since the latter would have been actuated to its marking contact 29 ahead of time. Such an early sampling would see no charge on the condenser C1 and a strong marking bias would be correctly indicated. However, if the excessive bias were spacing in character, sampling would not take place because relay R2 would have fallen back to spacing by the time relay R1 attempted to energize the sampling relay circuit. If relay R1 should close while the armature of relay R2 was in its transient state, the charge deposited on capacitor C3 would be that corresponding to a marking bias and contrary to fact. However, this condition would easily be recognized by the erratic and indecisive movements of the microammeter pointer and only exists for a spacing bias between 25 and 35 percent. If the first delay portion 32 of the time delay network were removed so that relay R2 would remove the short circuit across capacitor C1 upon the reception of the spacing signal impulse, the voltage rise across the capacitor would then have at the instant of sampling a rate of change or slope about one-third as great as is the case with a delay of 16.5 milliseconds and the accuracy of the device would be greatly impaired. In fact, the accuracy would be only within about 6% which ordinarily is quite insufficient. The 25% limit in regard to the magnitude of marking or spacing bias to be measured by the meter is, therefore, a practical compromise between even greater than present accuracy and the magnitude of bias likely to be encountered in practice.

The first portion 32 of the time delay network has a time delay which in percentage of an unbiased spacing signal unit interval represents the complement of the percent maximum marking bias to be measured by the bias meter, and the second portion 33 of the network has a time delay which in percentage of an unbiased spacing signal unit interval when added to the time delay in the first portion 32 exceeds the unbiased spacing signal unit interval by a percentage thereof equal to the percent maximum spacing bias to be measured by the bias meter. In the example above given, the first portion 32 has a time delay of 16.5 milliseconds representing 75% of an unbiased spacing signal unit interval of 22 milliseconds, and 75% is the complement of the 25% marking bias to be measured by the meter. The second portion 33 has a time delay of 11 milliseconds which represents 50% of an unbiased spacing signal unit interval; when 50% is added to the 75% of the first portion this gives 125% of an unbiased spacing signal unit interval which means that a maximum of 25% spacing bias can be measured by the meter. If the first portion 32 represented 50% and the second portion 33 represented 75% each of an unbiased spacing signal unit interval, this would enable the meter to measure up to 50% marking bias and 25% spacing bias.

For certain purposes the maximum percentage of bias required to be measured may be quite small, and therefore if the first portion represented 95% and the second portion represented 10% each of an unbiased spacing unit interval the meter could measure up to 5% of either marking or spacing bias. The two portions of the time delay network may, of course, have various different values depending upon the purposes for which the bias meter is to be used, although, as above stated, the values of 75% and 50% respectively of the first and second portions of the network will be found most practical.

Preferably, although not necessarily, the four single current relays R1 to R4 employed in the bias meter are of the mercury wetted contact type and thus are not susceptible to adjustment, and the small differences in the operating characteristics of individual relays may necessitate recalibration of the meter following the replacement of a relay. Recalibration is readily effected by nulling the bias meter on signals known to be unbiased and then slightly sliding or rotating the scale of the potentiometer to coincide with the new zero.

The signal bias meter and its attendant circuits and apparatus may be assembled in a case as small as 7 x 10 inches and 15 inches high with the removable cover in place, so that the instrument may readily be carried into the field for testing at any desired point. A power cord and a 2-conductor patch cord accompany the bias meter and can be coiled within the rectangular cover above the slanting face of the instrument. When so assembled the weight is but 26 pounds.

The foregoing description of the bias meter has emphasized the monitoring of single current or make-break teleprinter lines, but the bias meter responds equally well when inserted in the polar current ring or dummy circuit of a a telegraph network repeater system. In this latter position the operating technician is able to quickly determine whether the separate teleprinter lines radiating from the hub are transmitting unbiased signals into the network and if not, to temporarily remove the offending leg from the network until the condition is corrected. The indications of the bias meter are reasonably independent of distortion of current wave form in the signal leg. For example, the insertion of the inductance of a single teleprinter in a resistive leg will cause no measurable error; the insertion of three teleprinters will cause but a 2 to 3 percent spacing bias indication. The inductive reactance of a polar dummy circuit will not cause any error; nor will any substantial error be caused by power supply voltage variations within the limits of 115 to 125 volts. The normal power supply voltage for the instrument is 118 volts D. C., and power can be secured from any direct current convenience outlet supplying potential within the limits specified of 115 to 125 volts. The polarity of the outlet is of no importance, and the potential may be either positive or negative with respect to ground.

The parameters of the circuits illustrated are those chosen for suitable results for monitoring on commercial teleprinter circuits of the type commonly in use, and in which transmission of characters is effected at the usual speeds employed, but it will be obvious that for different signaling speeds and also for code signals in which the normal signal spacing interval is greater or less than approximately 22 milliseconds, the parameters of the time delay network and other elements of the system would be modified accordingly.

While the invention has been disclosed in what, at present, is considered a preferred practical embodiment, it is not intended that the invention be limited to the specific types of instrumentalities illustrated, and other types of equivalent instrumentalities and circuit arrangements may be employed, together with correspondingly different values of impedances, potentials, and other circuit parameters, without departing from the spirit of the invention which is not intended to be limited except as defined by the scope of the appended claims.

What is claimed is:

1. In a telegraph bias meter for indicating the amount of marking or spacing bias present in permutation code signals, a time delay network, means responsive to a signal transition from marking to spacing for impressing upon the input of said network a voltage for propagation therethrough, a comparison circuit comprising a capacitor and series resistor and a source of reference voltage representing an unbiased spacing signal unit interval, means operative when the voltage applied to the input of said network has reached a point in the network representing a time delay equal to a major part of the time of duration of said unbiased spacing signal unit interval for applying to said capacitor and series resistor a charging potential to cause the voltage across the terminals of the capacitor to rise exponentially with time, and means responsive to a succeeding signal transition from spacing to marking for measuring at that instant the magnitude and polarity of the difference voltage between said reference voltage and the voltage then appearing across said capacitor.

2. In a telegraph bias meter for indicating the the amount of marking or spacing bias present in permutation code signals, a time delay network, means responsive to a signal transition from marking to spacing for impressing upon the input of said network a voltage for propagation therethrough, a comparison circuit comprising a capacitor and series resistor and a source of reference voltage representing an unbiased spacing signal unit interval, means operative when the voltage applied to the input of said network has reached a point in the network representing a time delay of not less than 50% nor greater than 95% of the time of duration of said unbiased spacing signal unit interval for applying to said capacitor and series resistor a charging potential to cause the voltage across the terminals of the capacitor to rise exponentially with time, and means responsive to a succeeding signal transition from spacing to marking for measuring at that instant the magnitude and polarity of the difference voltage between said reference voltage and the voltage then appearing across said capacitor, and including means for interpreting said difference voltage in terms of percentage of marking or spacing bias.

3. In a telegraph bias meter for indicating the amount of marking or spacing bias present in permutation code signals, a time delay network, means responsive to a signal transition from marking to spacing for impressing upon the input of said network a voltage for propagation therethrough, a comparison circuit comprising a capacitor and series resistor and a source of reference voltage representing an unbiased spacing signal unit interval, means operative when the voltage applied to the input of said network has reached a point in the network representing a time delay which in percentage of an unbiased spacing signal unit interval represents the complement of the percent maximum marking bias to be measured by the bias meter for applying to said capacitor a charging potential to cause the voltage across the terminals of the capacitor to rise exponentially with time, and means responsive to a succeeding signal transition from spacing to marking for measuring at that instant the magnitude and polarity of the difference voltage between said reference voltage and the voltage then appearing across said capacitor, and including means for interpreting said difference voltage in terms of percentage of marking or spacing bias.

4. In a telegraph bias meter for indicating the amount of marking or spacing bias present in permutation code signals, a time delay network having a first portion followed by a second portion, said second portion having a time delay which in percentage of an unbiased spacing signal unit interval when added to the time delay in said first portion exceeds the unbiased spacing signal unit interval by a percentage thereof equal to the percent maximum spacing bias to be measured by the bias meter, means responsive to a signal transition from marking to spacing for impressing upon the input of the first portion of said network a voltage for propagation therethrough, a comparison circuit comprising a capacitor and series resistor and a source of reference voltage representing an unbiased spacing signal unit interval, means operative when the voltage applied to the input of said first portion of the network reached the end of said portion for applying to said capacitor and series resistor a charging potential to cause the voltage across the terminals of the capacitor to rise exponentially with time, and means responsive to a succeeding signal transition from spacing to marking for measuring at that instant the magnitude and polarity of the difference voltage between said reference voltage and the voltage then appearing across said capacitor, and including means for interpreting said difference voltage in terms of percentage of marking or spacing bias.

5. In a telegraph bias meter for indicating the amount of marking or spacing bias present in permutation code signals, a time delay network having a first portion followed by a second portion, said first portion of the network having a time delay which in percentage of an unbiased spacing signal unit interval represents the complement of the percent maximum marking bias to be measured by the bias meter, said second portion of the network having a time delay which in percentage of an unbiased spacing signal unit interval when added to the time delay in said first portion exceeds the unbiased spacing signal unit interval by a percentage thereof equal to the percent maximum spacing bias to be measured by the bias meter, means responsive to a signal transition from marking to spacing for impressing upon the input of said first portion of the network a voltage for propagation therethrough, a comparison circuit comprising a capacitor and series resistor and a source of reference voltage representing an unbiased spacing signal unit interval, means operative when the voltage applied to the input of said first portion of the network has reached the end of said portion for applying to said capacitor and series resistor a charging potential to cause the voltage across the terminals of the capacitor to rise exponentially with time, and means responsive to a succeeding signal transition from spacing to marking for measuring at that instant the magnitude and polarity of the difference voltage between said reference voltage and the voltage then appearing across said capacitor, and including means for interpreting said difference voltage in terms of percentage of marking or spacing bias.

6. In a telegraph bias meter for indicating the amount of marking or spacing bias present in permutation code signals, a time delay network having a first portion followed by a second portion, said first portion of the network having a time delay equal to approximately 75% of the time of duration of an unbiased spacing signal unit interval, said second portion of the network having a time delay equal to approximately 50% of the time of duration of an unbiased spacing signal unit interval, means responsive to a signal transition from marking to spacing for impressing upon the input of said first portion of the network a voltage for propagation therethrough, a comparison circuit comprising a capacitor and series resistor and a source of reference voltage representing an unbiased spacing signal unit interval, means operative when the voltage applied to the input of said first portion of the network has reached the end of said portion for applying to said capacitor and series resistor a charging potential to cause the voltage across the terminals of the capacitor to rise exponentially with time, and means responsive to a succeeding signal transition from spacing to marking for measuring at that instant the magnitude and polarity of the difference voltage between said reference voltage and the voltage then appearing across said capacitor, and including means for interpreting said difference voltage in terms of percentage of marking or spacing bias.

7. In a telegraph bias meter for indicating the amount of marking or spacing bias present in permutation code signals, a time delay network having a first portion followed by a second portion, said first portion of the network having a time delay which in percentage of an unbiased spacing signal unit interval represents the complement of the percent maximum marking bias to be measured by the bias meter, said second portion of the network having a time delay which in percentage of an unbiased spacing signal unit interval when added to the time delay in said first portion exceeds the unbiased spacing signal unit interval by a percentage thereof equal to the percent maximum spacing bias to be measured by the bias meter, means responsive to a signal transition from marking to spacing for impressing upon the input of said first portion of the network a voltage for propagation therethrough, a comparison circuit comprising a capacitor and series resistor and a source of reference voltage representing an unbiased spacing signal unit interval, means including a first relay operative when the voltage applied to the input of said first portion of the network has reached the end of said portion for applying to said capacitor and series resistor a charging potential to cause the voltage across the terminals of the capacitor to rise exponentially with time, means including a second relay operative upon the occurrence of a succeeding signal transition from spacing to marking for measuring at that instant the magnitude and polarity of the difference voltage between said reference voltage and the voltage then appearing across said capacitor, and including means for interpreting said difference voltage in terms of percentage of marking or spacing bias, and means, including a third relay operative when said voltage applied to the delay network has reached the end of said second portion thereof for deenergizing said first relay, to prevent false operation of the measuring circuit when two or more successive spacing signal unit intervals occur in a received character signal or when the code utilizes a marking interval at the end of each character which is substantially longer than each of the preceding unit intervals thereof.

8. In a telegraph bias meter for indicating the amount of marking or spacing bias present in permutation code signals, a time delay network having a first portion followed by a second portion, said first portion of the network having a time delay which in percentage of an unbiased spacing signal unit interval represents the complement of the percent maximum marking bias to be measured by the bias meter, said second portion of the network having a time delay which in percentage of an unbiased spacing signal unit interval when added to the time delay in said first portion exceeds the unbiased spacing signal unit interval by a percentage thereof equal to the percent maximum spacing bias to be measured by the bias meter, means comprising a first relay responsive to a signal transition from marking to spacing for impressing upon the input of said first portion of the network a voltage for propagation therethrough, a comparison circuit comprising a capacitor and series resistor and a source of reference voltage representing an unbiased spacing signal unit interval, means including a second relay operative when the voltage applied to the input of said first portion of the network has reached the end of said portion for applying to said capacitor a charging potential to cause the voltage across the terminals of the capacitor to rise exponentially with time, means including a third relay controlled jointly by said first and second relays and operative upon the occurrence of a succeeding signal transition from spacing to marking for measuring at that instant the magnitude and polarity of the difference voltage between said reference voltage and the voltage then appearing across said capacitor, and including means for interpreting said difference voltage in terms of percentage of marking or spacing bias, and means, including a fourth relay operative when said voltage applied to the delay network has reached the end of said second portion thereof for de-energizing said second relay to prevent said third relay from causing false operation of the measuring circuit when two or more successive spacing signal units occur in a received character signal or when the code utilizes a marking interval at the end of each character which is substantially longer than each of the preceding unit intervals thereof.

9. In a telegraph bias meter for indicating the amount of marking or spacing bias present in permutation code signals, a time delay network having a first portion followed by a second portion, said first portion of the network having a time delay which in percentage of an unbiased spacing signal unit interval represents the complement of the percent maximum marking bias to be measured by the bias meter, said second portion of the network having a time delay which in percentage of an unbiased spacing signal unit interval when added to the time delay in said first portion exceeds the unbiased spacing signal unit interval by a percentage thereof equal to the percent maximum spacing bias to be measured by the bias meter, means responsive to a signal transition from marking to spacing for impressing upon the input of said first portion of the network a voltage for propagation therethrough, a comparison circuit comprising a capacitor and series resistance and a source of reference voltage representing an unbiased spacing signal unit interval, means operative when the voltage applied to the input of said first portion of the network has reached the end of said portion for applying to said capacitor and series resistor a charging potential to cause the voltage across the terminals of the capacitor to rise exponentially with time, means including a relay operative upon the occurrence of a succeeding signal transition from spacing to marking for sampling at that instant the magnitude and polarity of the difference voltage between said reference voltage and the voltage then appearing across said capacitor, means responsive to said difference voltage for indicating whether marking or spacing bias is present, means for adjusting said reference voltage to match the voltage across the capacitor at the instant of sampling, and a scale operatively associated with the adjusting means for interpreting said adjustment of the reference voltage in terms of percentage of marking or spacing bias.

10. In a telegraph bias meter for indicating the amount of marking or spacing bias present in permutation code signals, a time delay network having a first portion followed by a second portion, said first portion of the network having a time delay which in percentage of an unbiased spacing signal unit interval represents the complement of the percent maximum marking bias to be measured by the bias meter, said second portion of the network having a time delay which in percentage of an unbiased spacing signal unit interval when added to the time delay in said first portion exceeds the unbiased spacing signal unit interval by a percentage thereof equal to the percent maximum spacing bias to be measured by the bias meter, means responsive to a signal transition from marking to spacing for impressing upon the input of said first portion of the network a voltage for propagation therethrough, a comparison circuit comprising a capacitor and series resistor and a potentiometer, said potentiometer having an adjustable slider and providing a source of reference voltage representing an unbiased spacing signal unit interval, means operative when the voltage applied to the input of said first portion of the network has reached the end of said portion for applying to said capacitor and series resistor a charging potential to cause the voltage across the terminals of the capacitor to rise exponentially with time, means including a relay operative upon the occurrence of a succeeding signal transition from spacing to marking for sampling at that instant the magnitude and polarity of the difference voltage between said reference voltage and the voltage then appearing across said capacitor, means responsive to said difference voltage for indicating whether marking or spacing bias is present, and means including the adjustable slider of said potentiometer and a scale operatively associated therewith for interpreting said difference voltage in terms of percentage of marking or spacing bias.

11. In a telegraph system, a line comprising a source of incoming marking and spacing permutation code signals, an impedance connected with said line for developing voltages in accordance with signal transitions from marking to spacing and vice versa, a circuit comprising a trigger device controlled in accordance with the voltages developed across the impedance due to said signal transitions, said trigger device having an output circuit controlling a device operative in accordance with said signal transitions and a source of power for energizing the last named device, a transformer interposed between said impedance and said trigger device for decoupling the voltage developed across the impedance from the source of power energizing said last named device, and means for causing the operation of said trigger device to be independent of the wave form of the current in the telegraph line and dependent upon the fundamental time of duration of each marking and spacing signal impulse received over the line, said last named means comprising a frequency discriminating circuit including said first impedance and the primary winding of said transformer to reduce the overall transfer admittance for low frequency components of the signal and cause the voltage induced in the secondary winding of the transformer to decline substantially to zero in approximately unit interval signal time.

12. In a telegraph system, a line comprising a source of incoming marking and spacing permutation code signals, an impedance connected with said line for developing voltages in accordance with signal transitions from marking to spacing and vice versa, a trigger tube circuit controlled in accordance with the voltages developed across the impedance due to said signal transitions, the output of said trigger tube circuit controlling a device operative in accordance with said signal transitions and a source of power for energizing the last named device, a transformer interposed between said impedance and the input of said trigger tube circuit for decoupling the voltage developed across the impedance from the source of power energizing said last named device, and a frequency discriminating circuit including said first impedance and the primary winding of said transformer to reduce the overall transfer admittance for low frequency components of the signal and cause the voltage induced in the secondary winding of the transformer to decline substantially to zero in approximately unit interval signal time.

13. In a telegraph bias meter for indicating the amount of marking or spacing bias present in marking and spacing permutation code signals incoming over a telegraph line, an impedance adapted to be connected with said line for developing voltages in accordance with signal transitions from marking to spacing and vice versa, a circuit comprising a trigger device controlled in accordance with the voltages developed across the impedance due to said signal transitions, said trigger device having an output circuit for controlling said bias meter in accordance with said signal transitions, a source of power for energizing the bias meter, a transformer interposed between said impedance and said trigger device for decoupling the voltage developed across the impedance from the source of power energizing the bias meter, and a frequency discriminating circuit including said first impedance and the primary winding of said transformer to reduce the overall transfer admittance for low frequency components of the signal and cause the voltage induced in the secondary winding of the transformer to decline substantially to zero in approximately unit interval signal time to insure that the operating time of the bias meter is unaffected by any preceding marking or spacing impulse received over said telegraph line.

14. In a telegraph bias meter for indicating the amount of marking or spacing bias present in permutation code signals received over a telegraph line, an impedance adapted to be connected with the line for developing voltages in accordance with signal transitions from marking to spacing and vice versa, a trigger tube circuit controlled in accordance with the voltages developed across the impedance due to said signal transitions, a transformer interposed between said impedance and the input of the trigger tube circuit for decoupling the voltage developed across the impedance from the source of power for energizing the bias meter, a time delay network, a relay controlled by the output of said trigger tube circuit and responsive to a signal transition from marking to spacing for impressing upon the input of the time delay network a voltage for propagation therethrough, a comparison circuit comprising a capacitor and series resistor and a source of reference voltage representing an unbiased spacing signal unit interval, means operative when the voltage applied to the input of said network has reached a point in the network representing a time delay equal to a predetermined part of the time of duration of said unbiased spacing signal unit interval for applying to said capacitor and series resistor a charging potential to cause the voltage across the terminals of the capacitor to rise exponentially with time, means responsive to the operation of said relay by a succeeding signal transition from spacing to marking for measuring at that instant the magnitude and polarity of the difference voltage between said reference voltage and the voltage then appearing across said capacitor, and a frequency discriminating circuit including said first impedance and the primary winding of said transformer to reduce the overall transfer admittance for low frequency components of the signal and cause the voltage induced in the secondary winding of the transformer to decline substantially to zero in approximately unit interval signal time to insure that the timing of said relay is unaffected by any preceding marking or spacing impulse received over said telegraph line.

HAROLD F. WILDER.

REFERENCES CITED

The following references are of record in the file of this patent:

UNITED STATES PATENTS

| Number | Name | Date |
|---|---|---|
| 2,176,742 | Pierre | Oct. 17, 1939 |
| 2,435,258 | Wilder | Feb. 3, 1948 |